US007962155B2

(12) United States Patent
Ghosh

(10) Patent No.: US 7,962,155 B2
(45) Date of Patent: Jun. 14, 2011

(54) LOCATION AWARENESS OF DEVICES

(75) Inventor: Riddhiman Ghosh, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 999 days.

(21) Appl. No.: 11/879,973

(22) Filed: Jul. 18, 2007

(65) Prior Publication Data
US 2009/0023410 A1 Jan. 22, 2009

(51) Int. Cl.
*H04W 24/00* (2009.01)
(52) U.S. Cl. ............... 455/456.2; 455/456.1; 455/67.11; 455/115.1; 370/338; 358/1.14
(58) Field of Classification Search ............... 455/456.1, 455/404.2, 440, 448; 358/1.14, 1.15; 370/338
See application file for complete search history.

(56) References Cited

U.S. PATENT DOCUMENTS

| 7,081,969 | B1 * | 7/2006 | Motamed et al. | 358/1.16 |
| 7,092,943 | B2 * | 8/2006 | Roese et al. | 1/1 |
| 2002/0186407 | A1 * | 12/2002 | Laughlin | 358/1.15 |
| 2003/0063589 | A1 * | 4/2003 | Haines et al. | 370/338 |
| 2005/0030574 | A1 * | 2/2005 | McVey et al. | 358/1.14 |

* cited by examiner

*Primary Examiner* — Kamran Afshar
*Assistant Examiner* — Shahriar Behnamian

(57) ABSTRACT

A method for managing devices is described. The method includes receiving wireless fingerprints from a plurality of devices, each of the wireless fingerprints comprising a unique device identifier, a wireless signal strength indicator that corresponds to a relative position a device is located with respect to one or more wireless access points and unique identifiers associated with the access points. The method further includes identifying a similarity between a first wireless fingerprint associated with a first of the plurality of devices and a second wireless fingerprint associated with a second of the plurality of devices and determining the first device is located physically close to the second device based on the similarity.

19 Claims, 7 Drawing Sheets

600

Receiving wireless fingerprints from a plurality of devices, each of the wireless fingerprints comprising a unique device identifier and a wireless signal strength indicator that corresponds to a relative position a device is located with respect to one or more wireless access points and unique identifiers associated with the access points
602

Identifying a similarity between a first wireless fingerprint associated with a first of the plurality of devices and a second wireless fingerprint associated with a second of the plurality of devices
604

Determining a degree of closeness between the first device and the second device based on the similarity
606

FIG. 6

LOCATION AWARENESS OF DEVICES

TECHNICAL FIELD

The present invention is related to device management. More specifically, embodiments of the present invention are related to determining the location of devices.

BACKGROUND

Determining the location of IT assets such as printers can be difficult. There are several applications where location information is useful, but it is not easily determinable.

One approach to determining the location of an asset includes manual configuration. For example, for every device, IT personal enters a location description such as "Building 4U, Post F45." However, this type of nomenclature is not standard and hence, not machine readable and cannot be used for automatic discovery. Humans have to read and interpret which devices are co-located, based on the name. This solution has limited accuracy and for a large number of devices, can be very labor intensive to maintain an accurate list.

An improved location awareness technique would be beneficial to managing devices.

SUMMARY OF THE INVENTION

A method for managing devices is described. The method includes receiving wireless fingerprints from a plurality of devices, each of the wireless fingerprints comprising a unique device identifier, a wireless signal strength indicator that corresponds to a relative position a device is located with respect to one or more wireless access points and a unique identifier associated with an access point. The method further includes identifying a similarity between a first wireless fingerprint associated with a first of the plurality of devices and a second wireless fingerprint associated with a second of the plurality of devices and determining the first device is located physically close to the second device based on the similarity.

BRIEF DESCRIPTION OF THE DRAWINGS

The above and other objects and advantages of the present invention will be more readily appreciated from the following detailed description when read in conjunction with the accompanying drawings, wherein:

FIG. 6 is a flow diagram of an exemplary method for managing a plurality of devices in accordance with embodiments of the present invention.

DETAILED DESCRIPTION OF THE INVENTION

Figure 1:
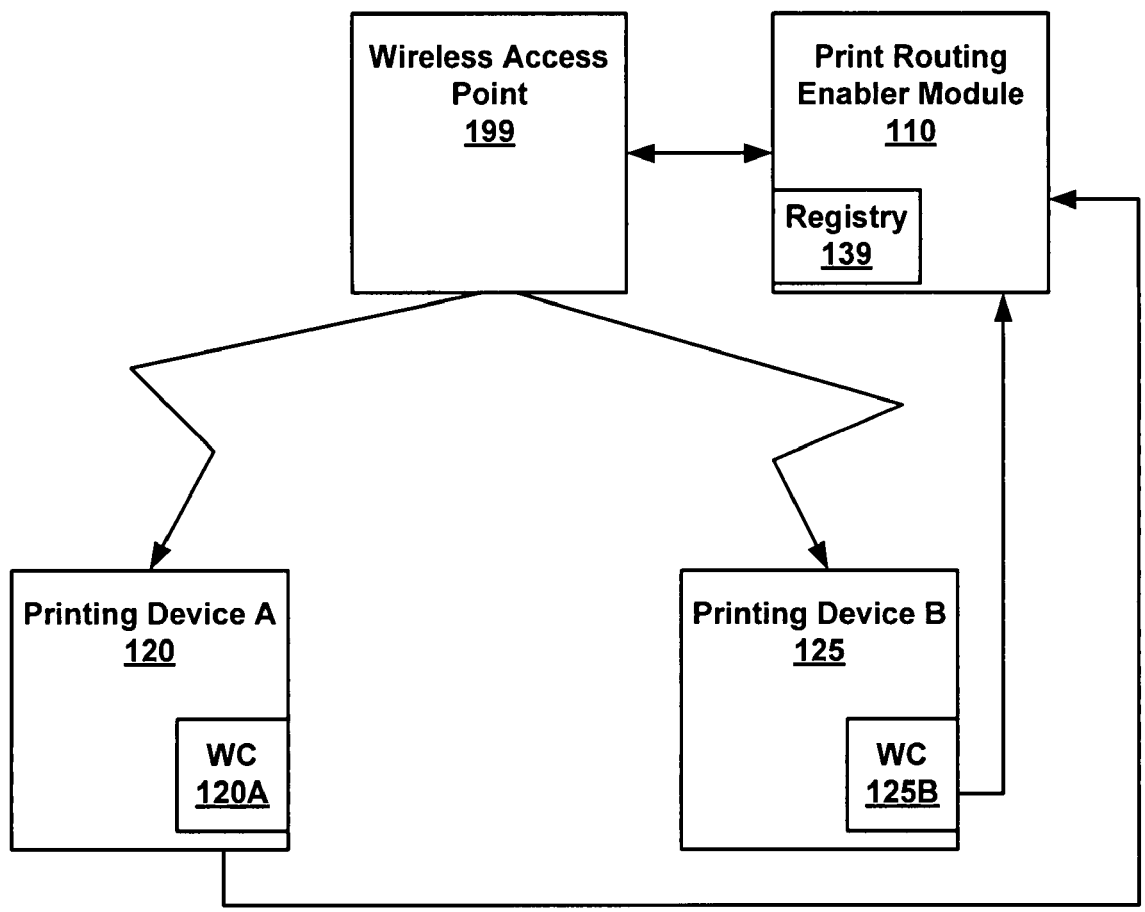
FIG. 1 is a block diagram of an exemplary system for determining the relative location of devices in accordance with embodiments of the present invention.

Reference will now be made in detail to embodiments of the present invention, location awareness of devices, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention use wireless access points found in enterprise environments to enable printers to be sentient to their neighborhood. For example, a printer with wireless communication capability would know which other printers are near and which printers are far away. This neighborhood awareness enables automatic rerouting of data from one printer to another that is near. In the case a printer is out of paper, the print job would be routed to another printer that is near the printer that is out of paper. The present invention also enables load balancing between multiple printers in the same relative location.

Other applications of the present invention include real-time location monitoring of devices for IT asset management and locating devices close to a particular location.

For purposes of brevity and clarity, the present invention will be described in the context of printing and printing devices. However, it is appreciated that embodiments of the present invention can be used to manage any number of devices with wireless capability that are coupled to a wireless network in accordance with the present invention.

In one embodiment of the invention, a wireless network accessory card is coupled to devices. The device scans the wireless neighborhood and notes the access points it receives measurable signals from and their strength. In one embodiment, a number of measurements are performed and average values are used to generate a "wireless fingerprint" associated with the device. In one embodiment, the wireless fingerprint is reported to a registry service.

It is appreciated that embodiments of the present invention are well suited to be used to monitor and manage devices with wireless capability. The devices may communicate over a hard-wired connection, a wireless connection or a combination of both. The devices do not need to be coupled to a wireless network. A wireless card, for instance, can obtain measurable signal strength from several access points even though it can be part of only one network. The wireless signals generated by a wireless capable device are used for diagnostics such as location determination.

In one embodiment, every device in the collection being managed reports a wireless fingerprint to the registry service. The registry service compares the fingerprints to determine which devices are co-located. In one embodiment, a clustering algorithm can be used to identify identical or similar fingerprints, which indicates closeness. In one embodiment, the registry service maintains a record of which devices are co-located with a particular device on the network.

The registry service may also keep track of which devices are "near" the particular device and which devices are "far" from the particular device. Although described in terms of "co-located," "near" and "far," it is appreciated that embodiments of the present invention can be used to describe the relative position of devices in any number of terms.

In one embodiment, the registry service can be queried. For example, given a particular device, the registry service can reply with a list of co-located devices, near devices and far devices.

It should be noted that embodiments of the present invention are well suited to determine the "relative" position of a device with respect to one or more wireless access point and hence with respect to other devices in the collection being monitored and/or managed. It is appreciated that determining the "relative" position of a device does not require any knowledge of the actual or absolute position of the device.

FIG. 1 is a block diagram of an exemplary system 100 for determining the relative location of devices in accordance with embodiments of the present invention. Embodiments of the present invention use the relative location of the devices to route a print job from a first printer to a second printer that is relatively close to the first printer. Routing can be initiated for any number of reasons. For example, in one embodiment, print jobs are routed to avoid sending a print job to a non-operational printer. In another embodiment, routing is initiated to balance a print load across a plurality of printers.

Printing device A 120 is capable of communicating wirelessly with wireless access point 199. A wireless card 120A serves as a wireless interface between printer 120 and wireless access point 199. Printing device A 120 receives a measurable wireless signal from access point 199. Printing device B 125 is capable of wirelessly communicating with wireless access point 199. A wireless card 125B serves as a wireless interface between printer 125 and wireless access point 199. Printing device B 125 receives a measurable wireless signal from access point 199.

As stated above, it is appreciated that printing device A 120 and Printing device B 125 do not need to communicate wirelessly with each other, but can have wired or other communication paths, or even no direct communication path between themselves. This is especially beneficial in the case that the wireless signal from wireless access point 199 is so weak as to not be sufficient to transfer data but can be used to determine location in accordance with embodiments of the present invention.

In FIG. 1, there is only one wireless access point shown, however, it is appreciated that embodiments of the present invention are well suited to be used with any number of wireless access points.

In one embodiment, wireless cards 120A and 125B report a "wireless fingerprint" back to the print routing enabler module 110. For purposes of the present invention, a "wireless fingerprint" includes a unique device identifier associated with the reporting device (e.g., serial number, network address, hardware address, etc.) a wireless signal strength identifier associated with the signal level the device obtains from one or more wireless access points, and the unique identifier associated with those wireless access points (e.g., serial number, hardware address, network address, etc.)

In one embodiment, a wireless fingerprint not only records a unique identifier of the reporting device, but also unique identifiers of the access points in the fingerprint, so different fingerprints can be compared. The details of a "wireless fingerprint" will be discussed in more detail below in conjunction with FIGS. 3-5. In one embodiment, the wireless fingerprints are registered in registry 139.

The wireless fingerprints reported by printing device A 120 and printing device B 125 are used to determine the relative positions of each with respect to the wireless access point 199. The relative locations can be used to determine which devices are close to each other. The closeness is determined by comparing the wireless fingerprints of the devices on the network. The more closely one wireless fingerprint matches another wireless fingerprint, the "closer" the devices are. Wireless fingerprints that are dissimilar indicate devices that are not close to each other.

The print routing enabler module uses the wireless fingerprints to determine which devices are co-located on the wireless network. As a result, print jobs that are sent to printing device A 120 can be automatically routed to printing device B 125 if printing device A 120 is co-located with printing device B 125. In one embodiment, an indicator is generated to show the print job was routed to another printing device.

Figure 2:
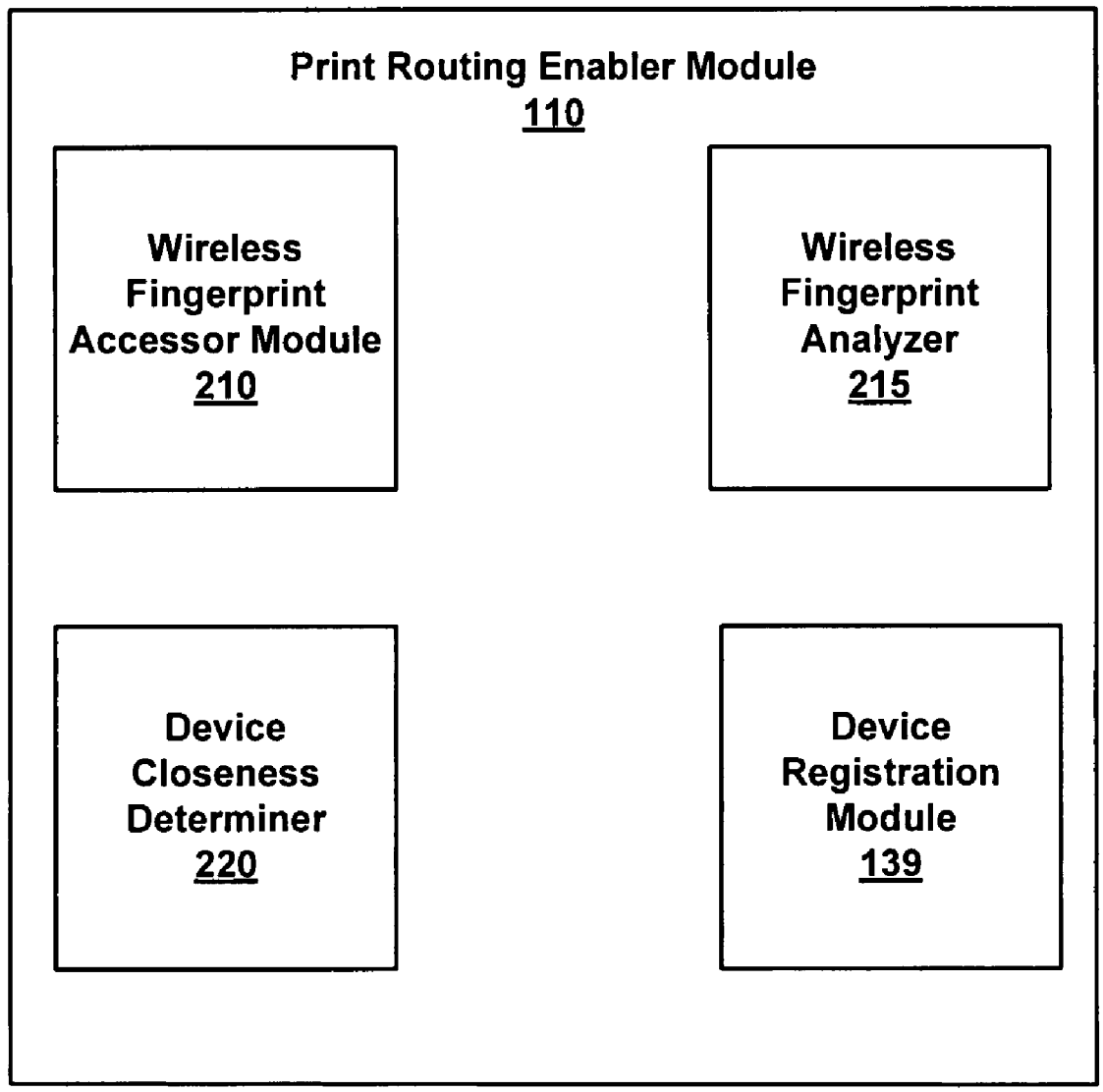
FIG. 2 is a block diagram of an exemplary print routing enabler module for routing print jobs in accordance with embodiments of the present invention.

FIG. 2 is a block diagram of an exemplary print routing enabler module 110 for routing print jobs in accordance with embodiments of the present invention. In one embodiment, the print routing enabler module includes a wireless fingerprint accessor module 210 for accessing wireless fingerprints from devices coupled to a wireless network. In one embodiment, the devices automatically report a wireless fingerprint to the wireless fingerprint accessor module 210. In one embodiment, the wireless fingerprints are registered in the device registration module 139. The wireless fingerprints can also be accessed from the wireless fingerprint registry 139 of FIG. 1 and the devices send their fingerprints periodically to the registry.

A wireless fingerprint analyzer 215 analyzes the wireless fingerprints to determine which fingerprints are similar. A device closeness determiner 220 uses the similarities to determine which devices are "co-located," "near," and "far" from one another.

Figure 3:
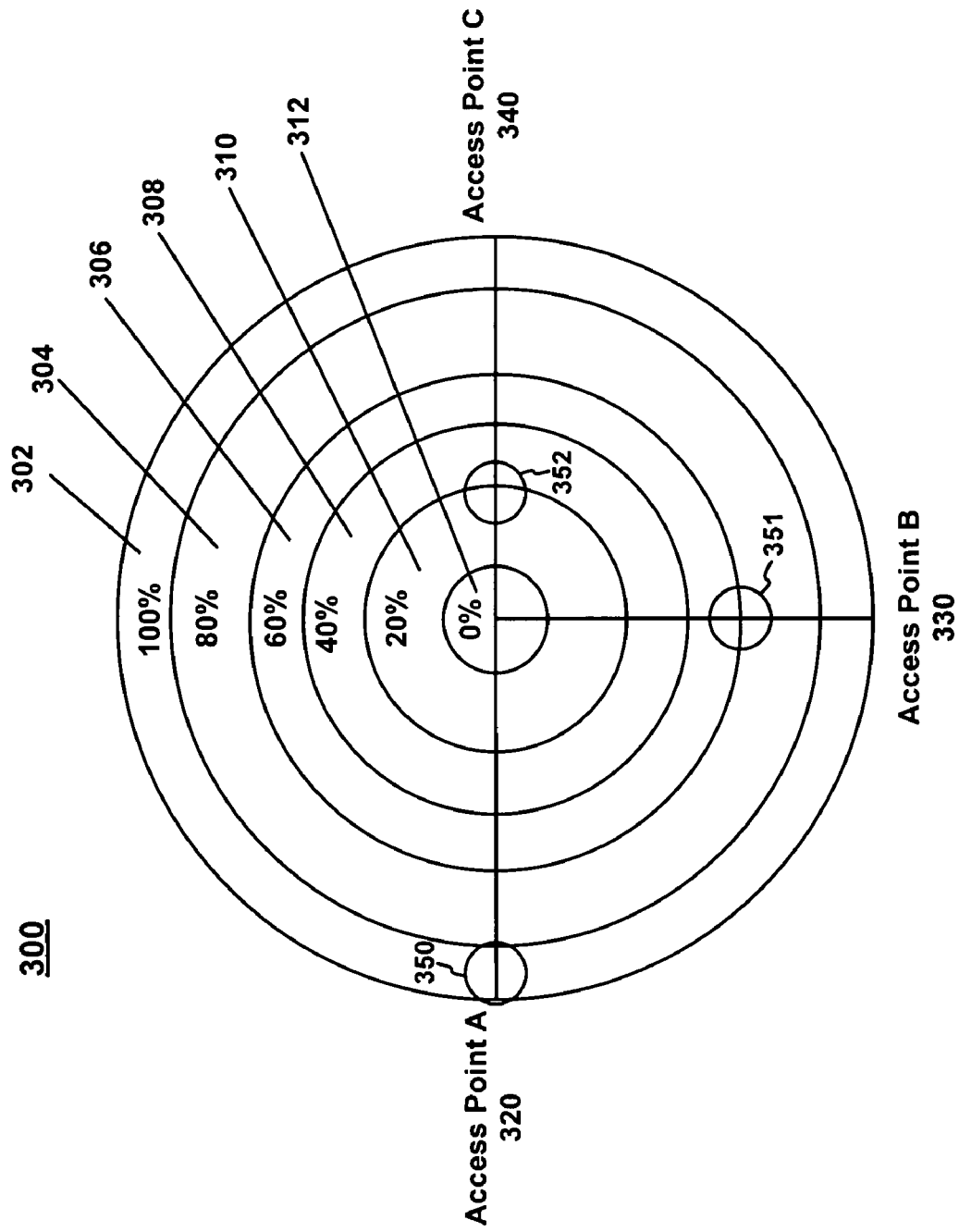
FIG. 3 is an illustration of an exemplary wireless fingerprint of a first device in accordance with embodiments of the present invention.

FIG. 3 is an illustration of an exemplary wireless fingerprint 300 of a first device in accordance with embodiments of the present invention. Wireless fingerprint 300 is associated with one device that has wireless communication capability. Wireless fingerprint 300 shows the signal strength detected and measurable by the device for a plurality of wireless access points. In this example, three wireless access points 320, 330 and 340 are shown.

The signal strength is shown by a percentage scale where 302 corresponds to 100% signal strength, 304 corresponds to 80% signal strength, 306 corresponds to 60% signal strength, 308 corresponds to 40% signal strength, 310 corresponds to 20% signal strength and 312 corresponds to 0% signal strength. The values plotted on the percentage scale may be normalized to account for variations in the sensitivities of different devices in one embodiment. Signal strength indicator 350 indicates 100% signal strength from wireless access point A 320. Signal strength indicator 351 indicates approximately 75% signal strength from access point B 330. Signal strength indicator 352 indicates 30% signal strength from access point 340.

Figure 4:
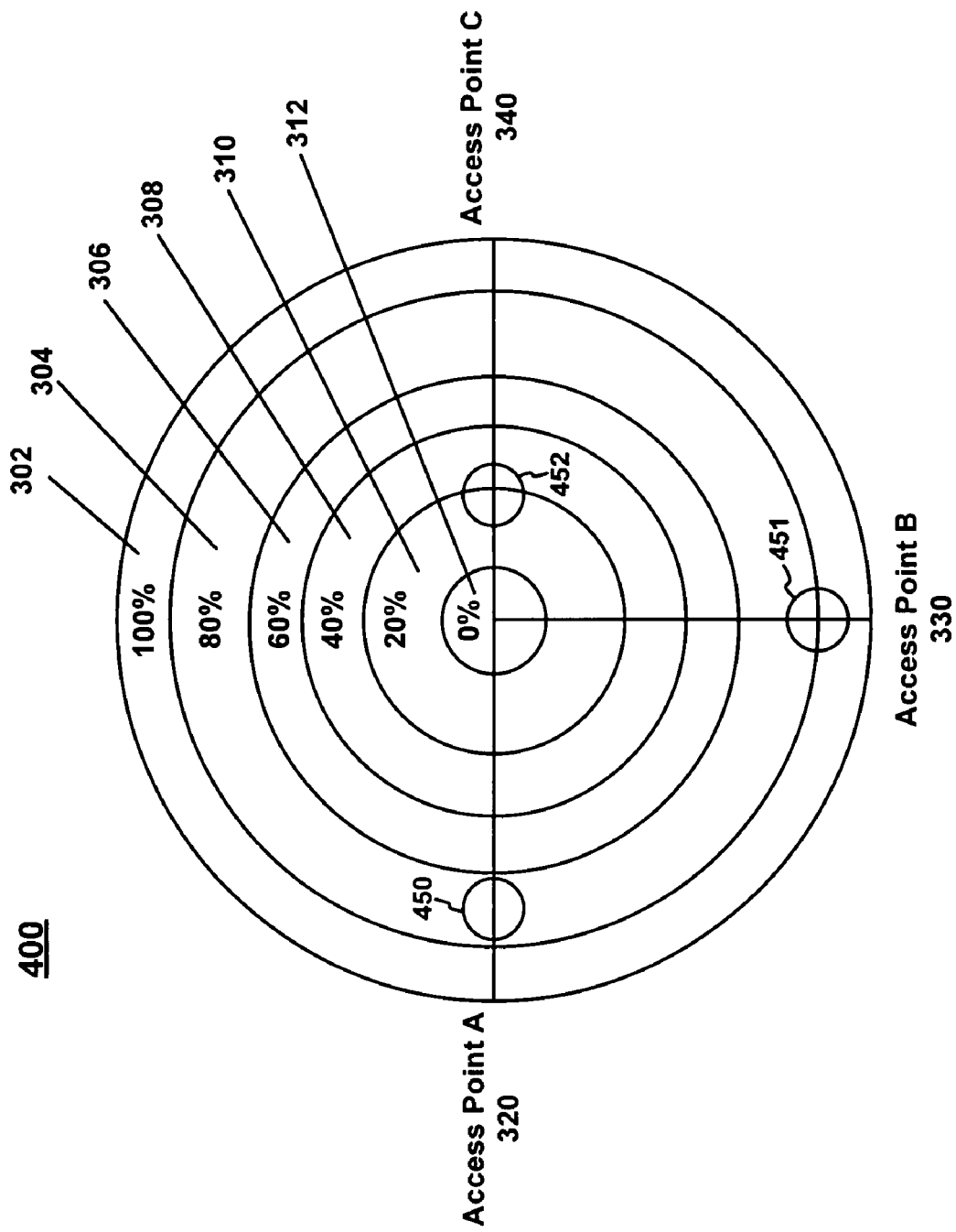
FIG. 4 is an illustration of an exemplary wireless fingerprint of a second device in accordance with embodiments of the present invention.

FIG. 4 is an illustration of an exemplary wireless fingerprint 400 of a second device with wireless communication capability in accordance with embodiments of the present invention. Wireless fingerprint 400 is associated with one device that is capable of wirelessly communicating. Wireless fingerprint 400 shows the signal strength detected and measured by the device for a plurality of wireless access points. In this example, three wireless access points 320, 330 and 340 are shown.

The signal strength is shown by a percentage scale where 302 corresponds to 100% signal strength, 304 corresponds to 80% signal strength, 306 corresponds to 60% signal strength, 308 corresponds to 40% signal strength, 310 corresponds to 20% signal strength and 312 corresponds to 0% signal strength. Signal strength indicator 450 indicates 80% signal strength from wireless access point A 320. Signal strength indicator 451 indicates approximately 95% signal strength from access point B 330. Signal strength indicator 452 indicates 30% signal strength from access point 340.

The fingerprint 300 of FIG. 3 is similar to fingerprint 400 of FIG. 4. For example, fingerprint 300 indicated 100% signal strength at access point A 320 and fingerprint 400 indicated 80% signal strength at access point A 320. Fingerprint 300 indicated 75% signal strength from access point B 330 and fingerprint 400 indicates 95% signal strength from access point B 330. Fingerprint 300 also indicated 30% signal strength from access point 340 and fingerprint 400 indicates 30% signal strength from access point 340. Since the fingerprints 300 and 400 are similar (with respect to the plurality of unique access points from which measurable signal is received and the strength of those signals), the devices associated with fingerprints 300 and 400 can be considered relatively close to each other.

Figure 5:
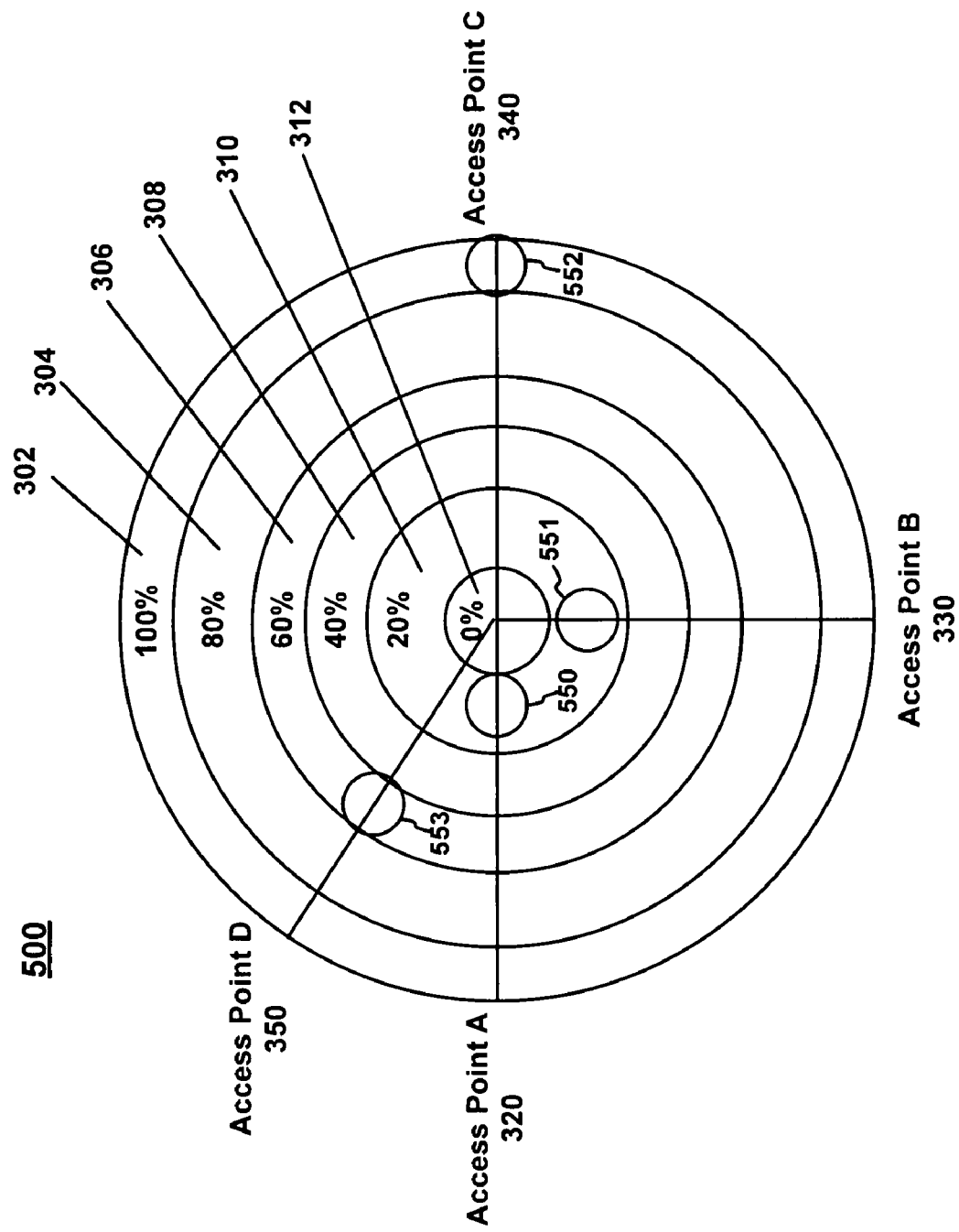
FIG. 5 is an illustration of an exemplary wireless fingerprint of a third device in accordance with embodiments of the present invention.

FIG. 5 is an illustration of an exemplary wireless fingerprint of a third device in accordance with embodiments of the present invention. Wireless fingerprint 500 is associated with one device that is capable of wirelessly communicating. Wireless fingerprint 500 shows the signal strength detected and measured by the device for a plurality of wireless access points. In this example, four wireless access points 320, 330, 340 and 350 are shown.

The signal strength is shown by a percentage scale where 302 corresponds to 100% signal strength, 304 corresponds to 80% signal strength, 306 corresponds to 60% signal strength, 308 corresponds to 40% signal strength, 310 corresponds to 20% signal strength and 312 corresponds to 0% signal strength. Signal strength indicator 550 indicates 20% signal strength from wireless access point A 320. Signal strength indicator 551 indicates 20% signal strength from access point B 330. Signal strength indicator 552 indicates 100% signal strength from access point 340. Signal strength indicator 553 indicates 60% signal strength from access point 350.

The fingerprint 500 of FIG. 5 is dissimilar to fingerprints 300 and 400 of FIGS. 3 and 4. For example, fingerprint 300 indicated 100% signal strength at access point A 320 and fingerprint 400 indicated 80% signal strength at access point A 320 where fingerprint 500 indicates a 20% signal strength from access point 320. Fingerprint 300 indicated 75% signal strength from access point B 330 and fingerprint 400 indicates 95% signal strength from access point B 330 where fingerprint 500 indicates a 20% signal strength from access point 330. Fingerprint 300 also indicated 30% signal strength from access point 340 and fingerprint 400 indicates 30% signal strength from access point 340 where fingerprint 500 indicates 100% signal strength from access point 340. Fingerprint 500 also indicated receipt of measurable signal strength from access point D 350 which fingerprints 300 and 400 did not.

Since the fingerprints 300 and 400 are dissimilar (with respect to the plurality of unique access points from which measurable signal is received and the strength of those signals) to fingerprint 500, the devices associated with fingerprints 300 and 400 can be considered not co-located with the device associated with fingerprint 500 of FIG. 5.

Thus, in one embodiment; both the presence or absence of common access points in a wireless fingerprint, and measured signal strength levels go into determining the relative position of devices and hence determining whether devices are near or far.

It is appreciated that any number of techniques can be used to determine similar or dissimilar wireless fingerprints in accordance with the present invention. In one embodiment, a Jaccard distance computation between the fingerprints, or a modified form of the Jaccard distance weighted for signal strengths can be performed to determine similarities.

FIG. 6 is a flow diagram of an exemplary method 600 for managing a plurality of devices in accordance with embodiments of the present invention.

At 602, 600 includes receiving wireless fingerprints from a plurality of devices, each of the wireless fingerprints comprising a unique identifier and a wireless signal strength indicator that corresponds to a relative position a device is located with respect to one or more wireless access points. In one embodiment, a unique identifier of the access points is also included in the wireless fingerprint.

In one embodiment, the unique indicator includes a network address or hardware address associated with a particular device.

In one embodiment, the signal strength Indicator includes an average signal strength measurement.

At 604, 600 includes identifying a similarity between a first wireless fingerprint associated with a first device and a second wireless fingerprint associated with a second device.

At 606, 600 includes determining a degree of closeness between the first device and the second device based on said similarity.

Exemplary Computer System

Figure 7:
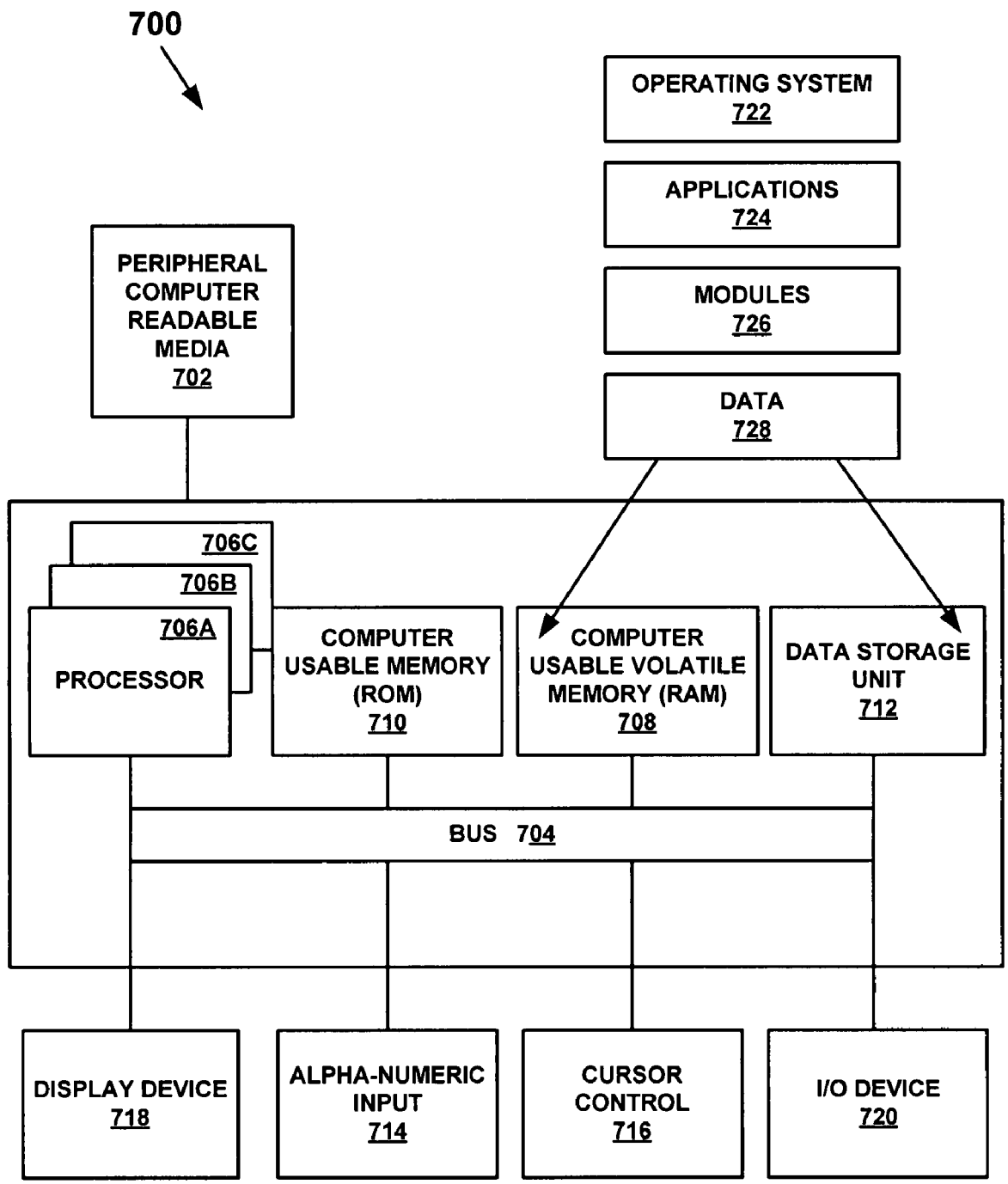
FIG. 7 illustrates an exemplary computer system used in accordance with embodiments of the present invention.

With reference now to FIG. 7, portions of the technology for location awareness of devices are composed of computer-readable and computer-executable instructions that reside, for example, in computer-usable media of a computer system. That is, FIG. 7 illustrates one example of a type of computer that can be used to implement embodiments, which are discussed below, of the present technology for location awareness of network devices.

FIG. 7 illustrates an exemplary computer system 700 used in accordance with embodiments of the present technology for location awareness of devices. It is appreciated that system 700 of FIG. 7 is exemplary only and that the present technology for location awareness of devices can operate on or within a number of different computer systems including general purpose networked computer systems, embedded computer systems, routers, switches, server devices, consumer devices, various intermediate devices/artifacts, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C.

System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alphanumeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a network adapter for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. In one embodiment, the present technology for location awareness of devices, for example, is stored as an application 724 or module 726 in memory locations within RAM 708 and memory areas within data storage unit 712.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for managing devices comprising:
   receiving wireless fingerprints from a plurality of devices, each of said wireless fingerprints comprising a unique device identifier and a wireless signal strength indicator that corresponds to a relative position a device is located with respect to one or more wireless access points and unique identifiers associated with said access points, wherein said plurality of devices are not required to be coupled to a wireless network;
   identifying a similarity between a first wireless fingerprint associated with a first of said plurality of devices and a second wireless fingerprint associated with a second of said plurality of devices;
   determining a degree of closeness between said first device and said second device based on said similarity;
   a data routing request receiver module for receiving a request to route data to said first of said plurality of devices; and
   a data rerouting module for automatically rerouting said data to said second of said plurality of devices.

2. The method as recited in claim 1 wherein said unique identifier comprises a hardware address or a network address.

3. The method as recited in claim 1 wherein said signal strength identifier comprises an average signal strength.

4. The method as recited in claim 1 further comprising: receiving a request to route data to said first of said plurality of devices; and automatically routing said data to said second of said plurality of devices.

5. The method as recited in claim 4 further comprising: generating an indicator that said data was routed to said second of said plurality of devices.

6. The method as recited in claim 1 further comprising: analyzing each of said wireless fingerprints to determine which of said plurality of devices are located physically close to each other.

7. The method as recited in claim 1 further comprising: analyzing each of said wireless fingerprints to determine which of said plurality of devices are located physically far from each other.

8. Instructions on a computer-usable medium wherein said instructions when executed cause a computer system to perform a method for printing, said computer-implemented method comprising:
   receiving a print request for routing a print job to a first printing device;
   determining a first wireless fingerprint associated with said first printing device;
   identifying a second wireless fingerprint associated with a second printing device that is similar to said wireless fingerprint associated with said first printing device;
   automatically routing said print request to said second printing device wherein said first and second wireless finger prints were determined based on relative positions of said first and second printers with respect to one access point and wherein said first and second printing devices are not required to be coupled to a wireless network;
   a data routing request receiver module for receiving a request to route data to said first of said plurality of devices; and
   a data rerouting module for automatically rerouting said data to said second of said plurality of devices.

9. The instructions of claim 8 wherein said method further includes: determining said second printing device is physically located close to said first printing device based on comparing said first wireless fingerprint to said second wireless fingerprint.

10. The instructions of claim 8 wherein said first wireless fingerprint comprises a unique identifier associated with said first wirelessly networked device.

11. The instructions of claim 10 wherein said unique identifier comprises a network address or hardware address.

12. The instructions of claim 8 wherein said first wireless fingerprint comprises a wireless signal strength indicator that corresponds to a relative position said first printing device is located with respect to one or more wireless access points.

13. The instructions of claim 12 wherein said signal strength identifier comprises an average signal strength.

14. The instructions of claim 8 further comprising: generating an indicator that said print request was routed to said second printing device.

15. A system for managing a plurality of devices with wireless communication capability comprising:
   a wireless fingerprint accessor module for accessing a plurality of wireless fingerprints from said plurality of devices provided with wireless communication capability, each of said wireless fingerprints comprising a unique device identifier, a wireless signal strength indicator that is dependent on a relative position a device is located with respect to one or more wireless access points and unique identifiers associated with said access points, wherein said plurality of devices are not required to be coupled to a wireless network;
   a wireless fingerprint analyzer module for identifying a similarity between a first wireless fingerprint associated with a first device and a second wireless fingerprint associated with a second device;
   a device closeness determiner module for determining said first device is located physically close to said second device based on said similarity;
   a data routing request receiver module for receiving a request to route data to said first of said plurality of devices; and a data rerouting module for automatically rerouting said data to said second of said plurality of devices.

16. The system as recited in claim 15 wherein said unique identifier comprises a network address or hardware address.

17. The system as recited in claim 15 wherein said signal strength identifier comprises an average signal strength.

18. The system as recited in claim 15 wherein said device closeness determiner module analyzes each of said wireless fingerprints to determine which of said plurality of devices are located physically close to each other.

19. The system as recited in claim 15 wherein said device closeness determiner module analyzes each of said wireless fingerprints to determine which of said plurality of devices are located physically far from each other.

* * * * *

UNITED STATES PATENT AND TRADEMARK OFFICE
CERTIFICATE OF CORRECTION

| | | |
|---|---|---|
| PATENT NO. | : 7,962,155 B2 | Page 1 of 1 |
| APPLICATION NO. | : 11/879973 | |
| DATED | : June 14, 2011 | |
| INVENTOR(S) | : Riddhiman Ghosh | |

It is certified that error appears in the above-identified patent and that said Letters Patent is hereby corrected as shown below:

In column 8, line 57, in Claim 8, delete "device" and insert -- device, --, therefor.

Signed and Sealed this
Sixth Day of December, 2011

David J. Kappos
*Director of the United States Patent and Trademark Office*